United States Patent
Yamazaki (10) Patent No.: US 9,923,689 B2
(45) Date of Patent: Mar. 20, 2018

(54) MOBILE COMMUNICATION SYSTEM, USER TERMINAL, AND PROCESSOR FOR ASSIGNING RADIO RESOURCES FOR TRANSMISSION OF SOUNDING REFERENCE SIGNALS AND DEVICE TO DEVICE COMMUNICATION RESOURCES

(71) Applicant: KYOCERA CORPORATION, Kyoto (JP)

(72) Inventor: Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/415,280

(22) PCT Filed: Jul. 23, 2013

(86) PCT No.: PCT/JP2013/069902
§ 371 (c)(1),
(2) Date: Jan. 16, 2015

(87) PCT Pub. No.: WO2014/017477
PCT Pub. Date: Jan. 30, 2014

(65) Prior Publication Data
US 2015/0188685 A1    Jul. 2, 2015

Related U.S. Application Data

(60) Provisional application No. 61/676,777, filed on Jul. 27, 2012.

(51) Int. Cl.
*H04L 5/00* (2006.01)
*H04W 72/04* (2009.01)
(Continued)

(52) U.S. Cl.
CPC ......... *H04L 5/0053* (2013.01); *H04B 17/309* (2015.01); *H04L 5/00* (2013.01);
(Continued)

(58) Field of Classification Search
CPC ....... H04B 17/309; H04L 5/00; H04L 5/0051; H04L 5/0053; H04L 5/0066;
(Continued)

(56) References Cited

U.S. PATENT DOCUMENTS

2007/0253498 A1* 11/2007 Matsumoto ......... H04L 27/2608
375/260
2009/0201951 A1* 8/2009 Ahn ..................... H04L 27/2655
370/509

(Continued)

FOREIGN PATENT DOCUMENTS

WO    WO 2011099225 A1 *  8/2011 ............. H04L 5/001
WO    WO 2011099324 A1 *  8/2011 ........... H04L 5/0048

OTHER PUBLICATIONS

International Search Report; PCT/JP2013/069902; dated Aug. 20, 2013.

(Continued)

*Primary Examiner* — Dung B Huynh
(74) *Attorney, Agent, or Firm* — Studebaker & Brackett PC (57) ABSTRACT

In a mobile communication system, comprising: a user terminal that performs communication with a base station and Device to Device (D2D) communication, the user terminal transmits a sounding reference signal to the base station. When at least a part of a first radio resource assigned to transmission of the sounding reference signal overlaps a second radio resource assigned to the D2D communication, the user terminal stops transmitting the sounding reference signal in the first radio resource.

3 Claims, 10 Drawing Sheets

(51) Int. Cl.
  *H04W 4/00* (2018.01)
  *H04W 76/02* (2009.01)
  *H04W 4/02* (2018.01)
  *H04W 48/14* (2009.01)
  *H04B 17/309* (2015.01)
  *H04W 52/38* (2009.01)

(52) U.S. Cl.
  CPC .......... *H04L 5/0051* (2013.01); *H04L 5/0066* (2013.01); *H04L 5/0073* (2013.01); *H04W 4/005* (2013.01); *H04W 4/008* (2013.01); *H04W 4/022* (2013.01); *H04W 48/14* (2013.01); *H04W 72/04* (2013.01); *H04W 72/0406* (2013.01); *H04W 76/023* (2013.01); *H04W 52/383* (2013.01)

(58) Field of Classification Search
  CPC .... H04L 5/0073; H04W 48/14; H04W 4/005; H04W 4/008; H04W 4/022; H04W 52/383; H04W 72/04; H04W 72/0406; H04W 76/023
  See application file for complete search history.

(56) References Cited

U.S. PATENT DOCUMENTS

| | | | | |
|---|---|---|---|---|
| 2010/0074205 A1* | 3/2010 | Papasakellariou | .... | H04L 5/0007 370/329 |
| 2010/0165882 A1* | 7/2010 | Palanki | ............... | H04W 76/023 370/254 |
| 2010/0226326 A1* | 9/2010 | Ahn | ................. | H04W 72/1278 370/329 |
| 2011/0065446 A1* | 3/2011 | Mueck | ................ | H04W 72/082 455/452.2 |
| 2012/0076071 A1* | 3/2012 | Kim | ..................... | H04L 5/0053 370/315 |
| 2012/0257519 A1* | 10/2012 | Frank | ................... | H04L 5/0035 370/252 |
| 2013/0010722 A1* | 1/2013 | Suzuki | ................. | H04L 1/1854 370/329 |
| 2013/0010723 A1* | 1/2013 | Ouchi | ................... | H04L 5/0048 370/329 |
| 2013/0034089 A1* | 2/2013 | Nakashima | ............ | H04L 5/001 370/337 |
| 2013/0051277 A1* | 2/2013 | Hakola | ............... | H04W 76/023 370/254 |
| 2013/0065585 A1* | 3/2013 | Pelletier | .................. | H04W 4/02 455/435.1 |
| 2013/0114505 A1* | 5/2013 | Haim | .................. | H04W 52/146 370/328 |
| 2013/0188546 A1* | 7/2013 | Turtinen | ............... | H04W 8/005 370/312 |
| 2013/0188620 A1* | 7/2013 | Dinan | ............... | H04W 56/0005 370/336 |
| 2013/0195084 A1* | 8/2013 | Chen | ................. | H04W 72/0413 370/336 |
| 2013/0195086 A1* | 8/2013 | Xu | ........................ | H04W 72/04 370/336 |
| 2013/0223356 A1* | 8/2013 | Khoshnevis | ........ | H04W 72/042 370/329 |
| 2013/0272231 A1* | 10/2013 | Dinan | .................... | H04W 52/34 370/329 |
| 2013/0288608 A1* | 10/2013 | Fwu | ....................... | H04W 72/02 455/63.1 |
| 2013/0300715 A1* | 11/2013 | Yamazaki | ........... | G06F 3/03545 345/175 |
| 2013/0303199 A1* | 11/2013 | Siomina | ................ | H04W 64/00 455/456.5 |
| 2013/0322276 A1* | 12/2013 | Pelletier | .............. | H04W 72/085 370/252 |
| 2013/0322388 A1* | 12/2013 | Ahn | .................... | H04W 76/023 370/329 |
| 2014/0064203 A1* | 3/2014 | Seo | ........................ | H04W 28/06 370/329 |
| 2014/0247802 A1* | 9/2014 | Wijting | ............... | H04W 76/023 370/329 |
| 2014/0321314 A1* | 10/2014 | Fodor | ................. | H04W 72/085 370/252 |
| 2015/0036601 A1* | 2/2015 | Kim | ..................... | H04L 5/0048 370/329 |
| 2015/0110038 A1* | 4/2015 | Yang | .................. | H04W 72/042 370/329 |

OTHER PUBLICATIONS

3GPP TR 22.803 V0.3.0 (May 2012); 3rd Generation Partnership Project; Technical Specification Group SA; Feasibility Study for Proximity Services (ProSe)(Release 12).

* cited by examiner

| PUCCH | PUSCH | D2D | PUSCH | PUCCH |
|---|---|---|---|---|
| PUCCH | PUSCH | D2D | PUSCH | PUCCH |
| PUCCH | PUSCH | D2D | PUSCH | PUCCH |
| PUCCH | PUSCH | D2D | PUSCH | PUCCH |
| PUCCH | PUSCH | D2D | PUSCH | PUCCH |
| PUCCH | PUSCH | D2D | PUSCH | PUCCH |
| PUCCH | PUSCH | D2D | PUSCH | PUCCH |
| PUCCH | PUSCH | D2D | PUSCH | PUCCH |
| PUCCH | PUSCH | D2D | PUSCH | PUCCH |
| PUCCH | PUSCH | D2D | PUSCH | PUCCH |
| #0 | #1 | #2 | #3 | #4 | #5 | #6 | #7 | #8 | #9 |

FIG. 10

| #0 | #1 | #2 | #3 | #4 | #5 | #6 | #7 | #8 | #9 |
|---|---|---|---|---|---|---|---|---|---|
| PUCCH | PUCCH | PUCCH | PUCCH | PUCCH | PUCCH | PUCCH | PUCCH | PUCCH | PUCCH |
| PUSCH | PUSCH | PUSCH | PUSCH | PUSCH | PUSCH | PUSCH | PUSCH | PUSCH | PUSCH |
| D2D | D2D | D2D | D2D | D2D | D2D | D2D | D2D | D2D | D2D |
| PUSCH | PUSCH | PUSCH | PUSCH | PUSCH | PUSCH | PUSCH | PUSCH | PUSCH | PUSCH |
| PUCCH | PUCCH | PUCCH | PUCCH | PUCCH | PUCCH | PUCCH | PUCCH | PUCCH | PUCCH |

| PUCCH | PUCCH | PUCCH | PUCCH | PUCCH | PUCCH | PUCCH | PUCCH | PUCCH | PUCCH |
| PUSCH | PUSCH | PUSCH | PUSCH | PUSCH | PUSCH | PUSCH | PUSCH | PUSCH | PUSCH |
| D2D | D2D | D2D | D2D | D2D | D2D | D2D | D2D | D2D | D2D |
| PUSCH | PUSCH | PUSCH | PUSCH | PUSCH | PUSCH | PUSCH | PUSCH | PUSCH | PUSCH |
| PUCCH | PUCCH | PUCCH | PUCCH | PUCCH | PUCCH | PUCCH | PUCCH | PUCCH | PUCCH |
| #0 | #1 | #2 | #3 | #4 | #5 | #6 | #7 | #8 | #9 |

FIG. 13

| | #0 | #1 | #2 | #3 | #4 | #5 | #6 | #7 | #8 | #9 |
|---|---|---|---|---|---|---|---|---|---|---|
| | PUCCH | PUCCH | PUCCH | PUCCH | PUCCH | PUCCH | PUCCH | PUCCH | PUCCH | PUCCH |
| | PUSCH | PUSCH | PUSCH | PUSCH | PUSCH | PUSCH | PUSCH | PUSCH | PUSCH | PUSCH |
| | | | | | D2D | D2D | D2D | D2D | D2D | D2D |
| | PUSCH | PUSCH | PUSCH | PUSCH | PUSCH | PUSCH | PUSCH | PUSCH | PUSCH | PUSCH |
| | PUCCH | PUCCH | PUCCH | PUCCH | PUCCH | PUCCH | PUCCH | PUCCH | PUCCH | PUCCH |

MOBILE COMMUNICATION SYSTEM, USER TERMINAL, AND PROCESSOR FOR ASSIGNING RADIO RESOURCES FOR TRANSMISSION OF SOUNDING REFERENCE SIGNALS AND DEVICE TO DEVICE COMMUNICATION RESOURCES

TECHNICAL FIELD

The present invention relates to a mobile communication system that supports D2D communication.

BACKGROUND ART

In 3GPP (3rd Generation Partnership Project) which is a project aiming to standardize a mobile communication system, the introduction of Device to Device (D2D) communication is discussed as a new function after Release 12 (see Non-patent Document 1).

In the D2D communication, a plurality of user terminals adjacent to one another perform direct radio communication in a frequency band assigned to a mobile communication system. In addition, the D2D communication is also called Proximity Service communication.

PRIOR ART DOCUMENT

Non-Patent Document

Non-Patent Document 1: 3GPP technical report "TR 22. 803 V0.3.0" May 2012

SUMMARY OF THE INVENTION

However, the current specifications has a problem in that there is no framework for allowing normal communication (cellular communication) to coexist with D2D communication in a mobile communication system.

Therefore, the present invention provides a mobile communication system with which it is possible to allow cellular communication and D2D communication to appropriately coexist with each other.

According to one embodiment, in a mobile communication system comprising: a user terminal that performs communication with a base station and Device to Device (D2D) communication, the user terminal transmits a sounding reference signal to the base station. When at least a part of a first radio resource assigned to transmission of the sounding reference signal overlaps a second radio resource assigned to the D2D communication, the user terminal stops transmitting the sounding reference signal in the first radio resource.

According to one embodiment, a user terminal that performs communication with the base station and Device to Device (D2D) communication, comprises: a transmission unit that transmits a sounding reference signal to the base station. When at least a part of the first radio resource assigned to transmission of the sounding reference signal overlaps the second radio resource assigned to the D2D communication, the transmission unit stops transmitting the sounding reference signal in the first radio resource.

According to one embodiment, a processor provided in the user terminal that performs communication with the base station and Device to Device (D2D) communication, performs: a process of stopping transmission of the sounding reference signal in the first radio resource assigned to the transmission of the sounding reference signal to the base station when at least a part of the first radio resource overlaps the second radio resource assigned to the D2D communication.

DESCRIPTION OF THE EMBODIMENT (1) Overview of Embodiment

In a mobile communication system including a user terminal that performs communication with a base station (that is, cellular communication) and Device to Device (D2D) communication, the user terminal transmits a sounding reference signal (SRS) to the base station. When at least a part of a first radio resource assigned to the transmission of the sounding reference signal overlaps a second radio resource assigned to the D2D communication, the user terminal stops transmitting the sounding reference signal in the first radio resource.

In this way, it is possible to avoid that the second radio resource is not available due to the transmission of the sounding reference signal, so that it is possible to appropriately perform the D2D communication.

Furthermore, the sounding reference signal is a reference signal used when the base station estimates channel characteristics for the first radio resource and controls the cellular communication on the basis of the estimated channel characteristics.

Thus, when the first radio resource overlaps the second radio resource for the D2D communication, significance for the estimation of the channel characteristics for the first radio resource is reduced. In other words, even though the transmission of the sounding reference signal in the first radio resource overlapping the second radio resource is stopped, it is possible to appropriately perform the cellular communication.

Consequently, according to the present embodiment, it is possible to allow cellular communication and D2D communication to appropriately coexist with each other.

When a part of the first radio resource overlaps second radio resource, the user terminal may stop transmitting the sounding reference signal in only the overlapping part of the first radio resource.

In this way, it is possible to transmit the sounding reference signal in a part of the first radio resource, which does not overlap the second radio resource, so that it is possible to more appropriately perform the cellular communication.

Alternatively, the base station may assign at least one of the first radio resource and the second radio resource such that a boundary of the first radio resource coincides, in a frequency direction, with a boundary of the second radio resource.

In this way, it is possible to avoid partial overlap of the first radio resource and the second radio resource, so that it is possible to reduce the frequency in which the transmission of the sounding reference signal is to be stopped.

Hereinafter, with reference to the drawings, a description will be provided for an embodiment when the D2D communication is introduced to a cellular mobile communication system (hereinafter, an "LTE system") configured based on the 3GPP standards.

(2) LTE System

Figure 1:
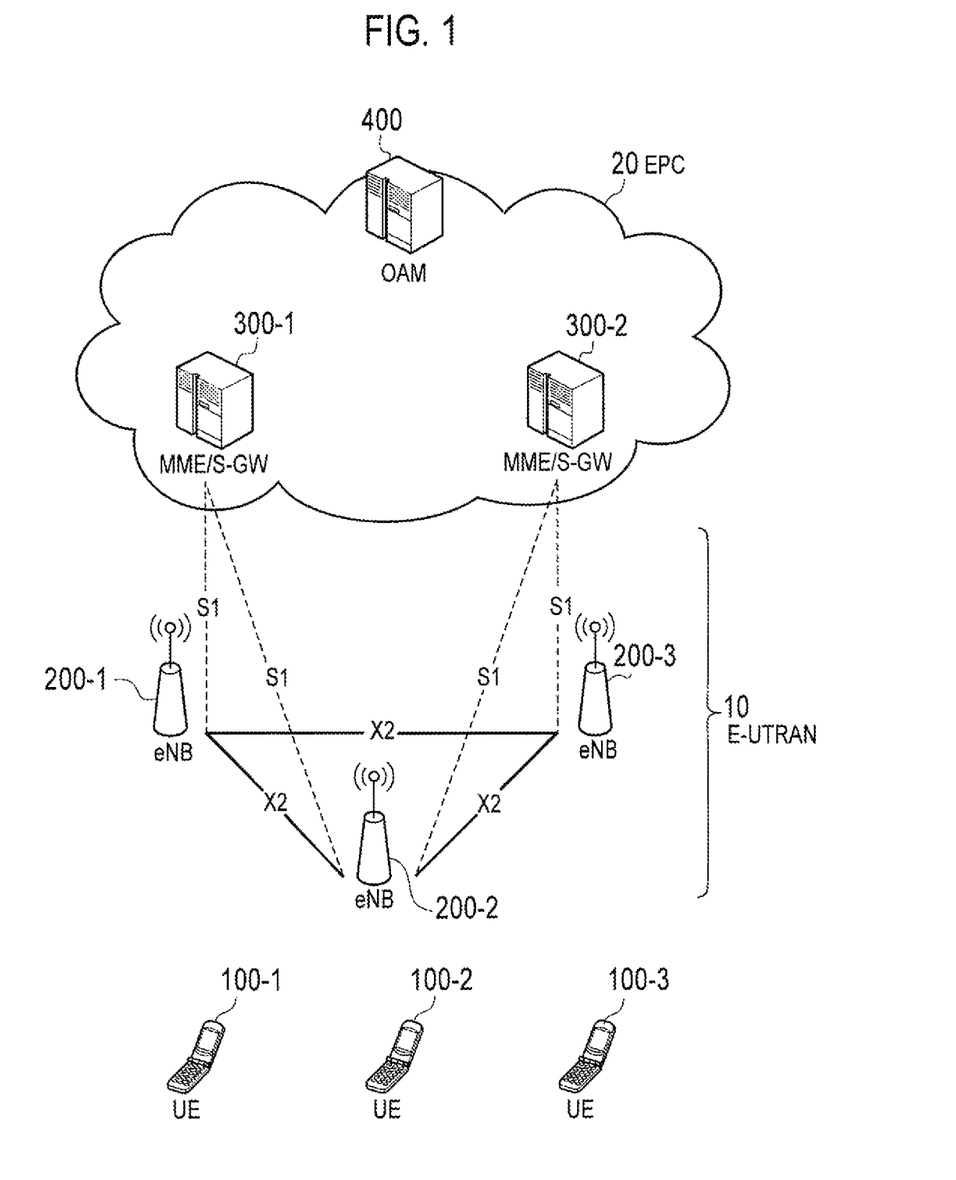
FIG. 1 is a configuration diagram of an LTE system.

FIG. 1 is a configuration diagram of an LTE system according to the present embodiment.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to the base station. The eNB 200 controls the cell and performs radio communication with the UE 100 that has established a connection with the cell.

In addition, the "cell" is used as a term indicating a minimum unit of a radio communication area, and is also used as a function of performing radio communication with the UE 100.

The eNB 200, for example, has a radio resource management (RRM) function, a routing function of user data, and a measurement control function for mobility control and scheduling.

The EPC 20 includes MME (Mobility management Entities)/S-GW (Serving-Gateway) 300, and OAM (Operation and Maintenance) 400.

The MME is a network node for performing various mobility controls and the like for the UE 100 and corresponds to a control station. The S-GW is the network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
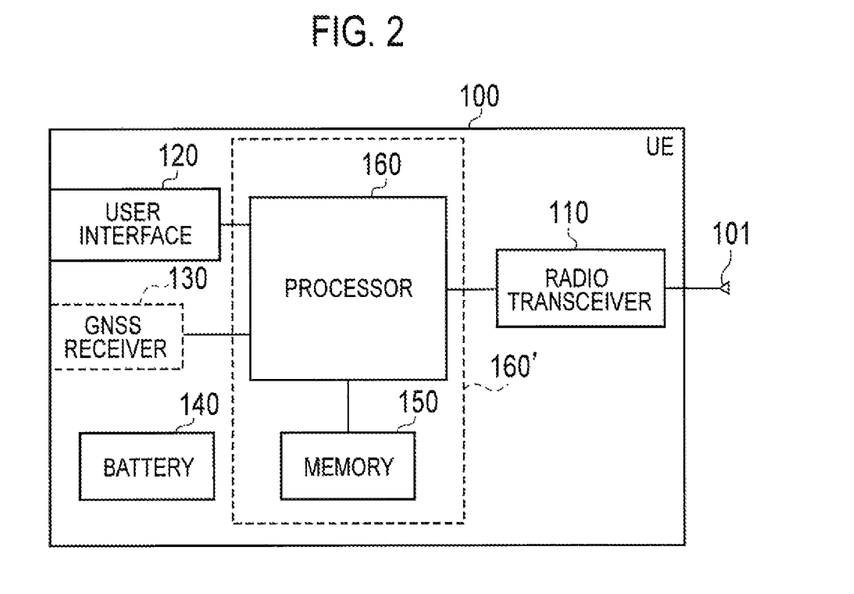
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. In addition, the memory 150 is integrated with the processor 160, and this set (that is, a chipset) may be called a processor 160'.

The antenna 101 and the radio transceiver 110 correspond to a part of a layer 1 and are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received in the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 stores a power to be supplied to each block of the UE 100.

The memory 150 stores a program to be executed by the processor 160 and information to be used for a process by the processor 160.

The processor 160 includes a baseband processor configured to perform modulation and demodulation, coding and decoding and the like of the baseband signal, and a CPU (Central Processing Unit) configured to perform various processes by executing the program stored in the memory 150. The processor 160 may further include a codec that performs encoding and decoding of sound and video signals.

The processor 160, for example, performs various processes and implements various communication protocols which will be described later. Details of a process performed by the processor 160 will be described below.

Figure 3:
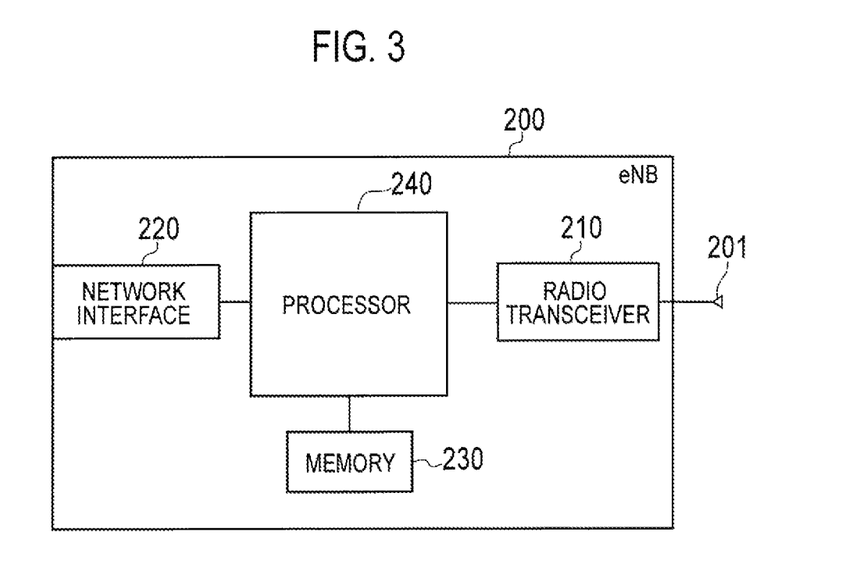
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit.

The antenna 201 and the radio transceiver 210 correspond to a part of the layer 1 and are used to transmit and receive the radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received in the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes a baseband processor that performs modulation and demodulation, and encoding and decoding of the baseband signal and the CPU that executes the program stored in the memory 230 to perform various processes.

The processor 240, for example, performs various processes and implements various communication protocols which will be described later. Details of a process performed by the processor 240 will be described below.

Figure 4:
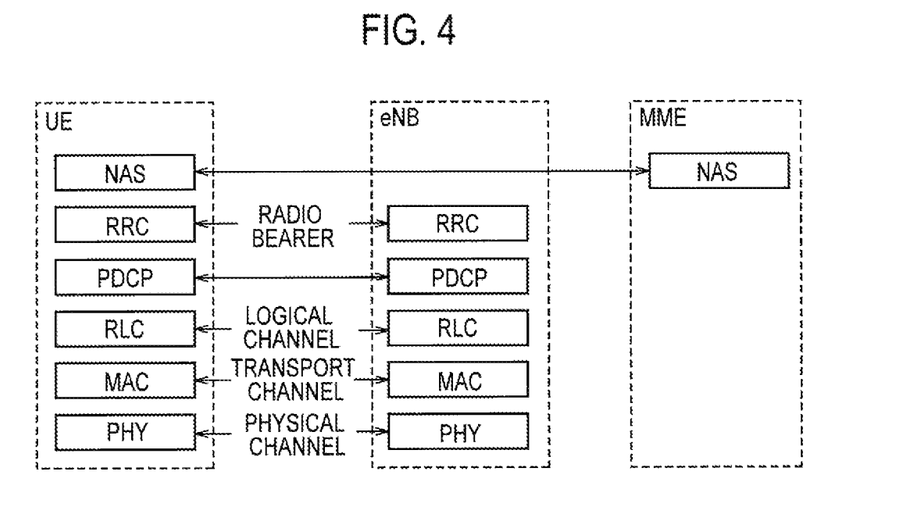
FIG. 4 is a protocol stack diagram of a radio interface in the LTE system.

FIG. 4 is a protocol stack diagram of a radio interface in the LTE system.

As illustrated in FIG. 4, the radio interface protocol is classified into layers 1 to 3 of an OSI reference model, and the layer 1 is a physical (PHY) layer. The layer 2 is further classified into a plurality of sublayers, and includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes a transport format of an uplink and a downlink (a transport block size, a modulation and coding scheme, and the like) and a MAC scheduler for determining a resource block to be assigned.

The RLC layer transmits data to the RLC layer of a reception side by using the functions of the MAC layer and the PHY layer. Between the RLC layer of the UE 100 and the RLC layer of the eNB 200, data is transmitted through a logical channel.

The PDCP layer performs header compression and extension, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of the radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management.

Figure 5:
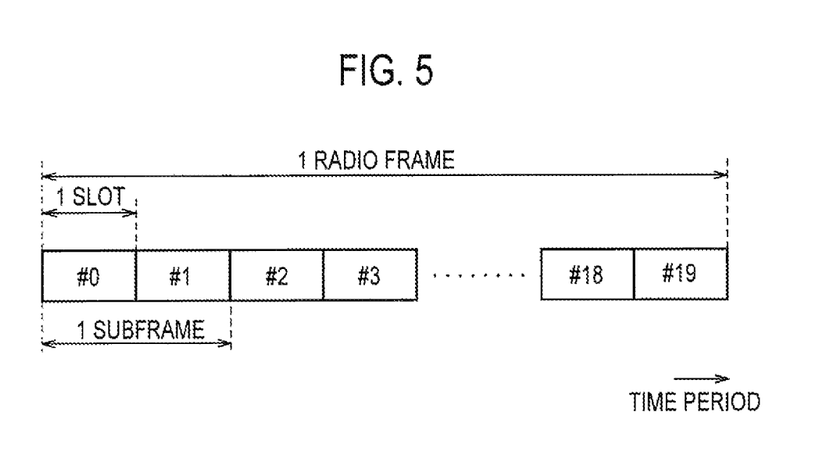
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame includes 10 subframes arranged in a time-period direction, wherein each subframe includes two slots arranged in the time-period direction. Each subframe has a length of 1 ms and each slot has a length of 0.5 ms. Each subframe includes a plurality of resource blocks (RBs) in a frequency direction, and a plurality of symbols in the time-period direction. Each symbol is provided at a head thereof with a guard interval called a cyclic prefix (CP). The resource block includes a plurality of subcarriers in the frequency direction. A radio resource unit including one subcarrier and one symbol is called a resource element (RE).

For example, among radio resources assigned to the UE 100, a frequency resource is designated by a resource block and a time resource is designated by a subframe. That is, the radio resource assigned to the UE 100 can be designated by a combination of the resource block and the subframe.

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH). Moreover, in each subframe, a demodulation reference signal (DMRS) and a sounding reference signal (SRS) are arranged. Specifically, the demodulation reference signal is arranged at a fourth symbol of each slot in the case of a normal CP and is arranged at a third symbol of each slot in the case of an extended CP. The sounding reference signal is arranged at a final symbol of a subframe.

(3) Sounding Reference Signal (SRS)

Next, the sounding reference signal (SRS) will be described. In the present embodiment, SRS that is periodically transmitted will be mainly described. However, it is noted that the present invention can also be applied to SRS that is aperiodically transmitted.

The RRC layer of the eNB 200 determines an SRS resource (a first radio resource) that is a radio resource assigned for the transmission of SRS by the UE 100, and notifies the RRC layer of the UE 100 of an RRC message including an SRS parameter regarding the determined SRS resource.

Figure 6:
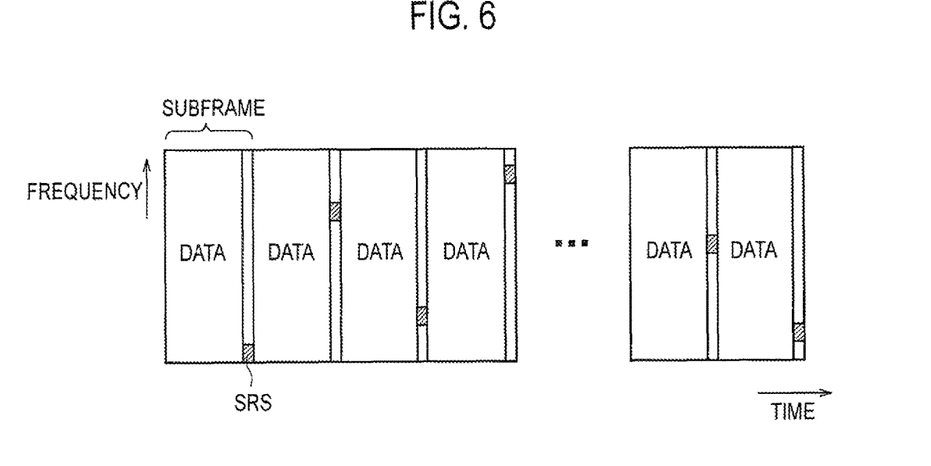
FIG. 6 is a diagram for explaining a detailed example of items which can be set in the SRS parameter.

FIG. 6 is a diagram for explaining a detailed example of items which can be set in the SRS parameter. FIG. 6 illustrates a frame structure in an uplink frequency band.

Items which can be set by the eNB 200 include, for example, an SRS transmission bandwidth, an SRS transmission cycle, an SRS hopping bandwidth, an SRS transmission start band, and SRS transmission power. The SRS transmission bandwidth is a frequency bandwidth of SRS when the UE 100 transmits the SRS. The SRS transmission cycle is a cycle by which the UE 100 transmits the SRS. The SRS hopping bandwidth is a range in which the transmission of the SRS is permitted in the uplink frequency band. The SRS transmission start band is a frequency band in which the SRS is initially transmitted in the SRS hopping bandwidth. The SRS transmission power is transmission power of the SRS when the UE 100 transmits the SRS.

As illustrated in FIG. 6, in each subframe, the transmission band of the SRS is hopped, so that wideband sounding is possible. That is, the SRS is repeatedly transmitted while changing the transmission band of the SRS within the SRS hopping bandwidth, so that the eNB 200 is able to estimate channel characteristics of all uplink frequency bands.

On the basis of the channel characteristics estimated by using the SRS, the MAC layer of the eNB 200, for example, performs scheduling for determining an uplink resource block to be assigned to the UE 100, and link adaptation for optimizing a modulation and coding scheme (MCS) and transmission power of the uplink.

(4) D2D Communication

Next, the D2D communication will be described with comparing the normal communication (the cellular communication) in the LTE system.

Figure 7:
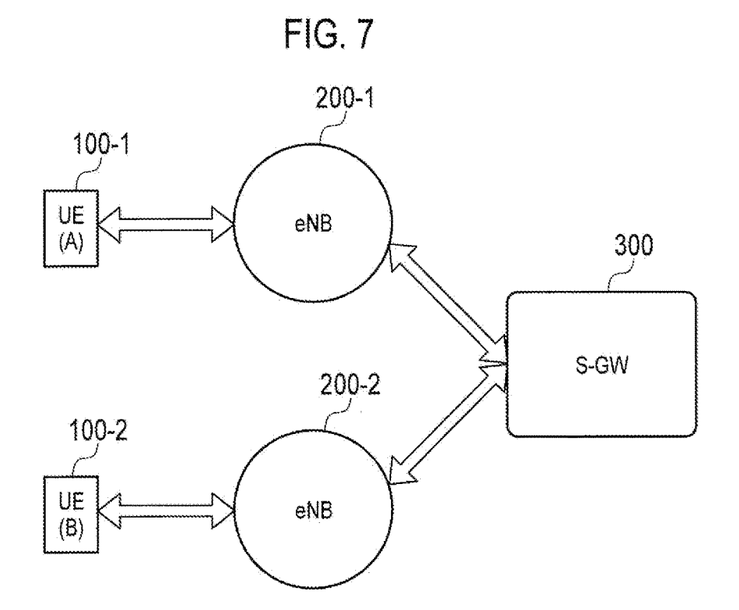
FIG. 7 illustrates a data path in cellular communication.

FIG. 7 illustrates a data path in the cellular communication. FIG. 7 illustrates the case in which the cellular communication is performed between UE 100-1 that establishes a connection with eNB 200-1 and UE 100-2 that establishes a connection with eNB 200-2. In addition, the data path indicates a transfer path of user data (a user plane).

As illustrated in FIG. 7, the data path of the cellular communication passes through the network. Specifically, the data path is set to pass through the eNB 200-1, the S-GW 300, and the eNB 200-2.

Figure 8:
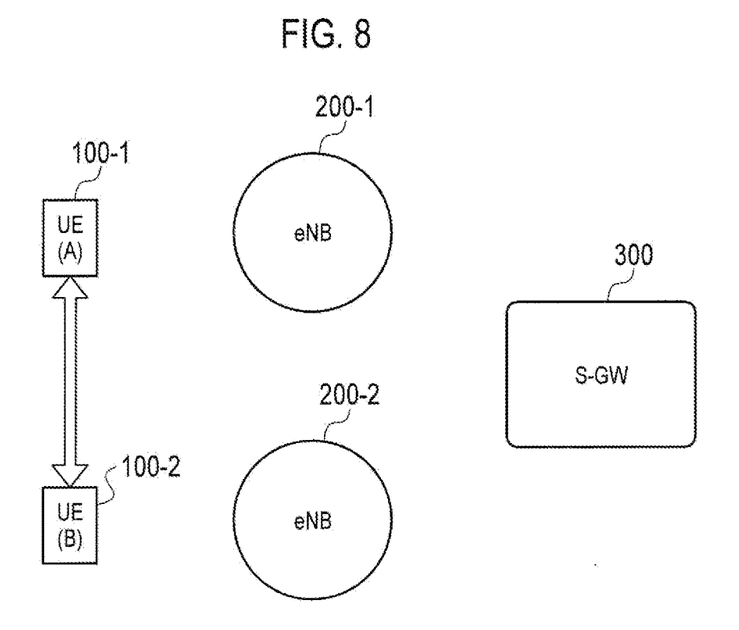
FIG. 8 illustrates a data path in D2D communication.

FIG. 8 illustrates a data path in the D2D communication. FIG. 8 illustrates the case in which the D2D communication is performed between the UE 100-1 that establishes a connection with the eNB 200-1 and the UE 100-2 that establishes a connection with the eNB 200-2. In this case, the UE 100-1 and the UE 100-2 constitute a D2D group.

For example, one UE 100 of the UE 100-1 and the UE 100-2 discovers the other UE 100 existing in the vicinity of the one UE 100, so that the D2D communication starts. In addition, in order to start the D2D communication, the UE 100 has a (Discover) function of discovering the other UE 100 existing in the vicinity of the UE 100. Furthermore, the UE 100 has a (Discoverable) function discovered by the other UE 100.

As illustrated in FIG. 8, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced.

Furthermore, the D2D communication is considered to be performed in a frequency band of the LTE system, and for example, in order to avoid interference to the cellular communication, the D2D communication is performed under the control of the network (eNB 200).

In the present embodiment, the D2D communication is performed in the uplink frequency band of the cellular communication. That is, the D2D resource (the second radio resource), which is a radio resource for the D2D communication, is included in the uplink frequency band.

Hereinafter, an example of the assignment of the D2D resource will be described. In the scheduler of the eNB 200, the D2D resource is dynamically or quasi-statically (semi-persistently) assigned, and downlink control information (DCI) indicating the assigned D2D resource is notified to the UE 100 on the PDCCH.

Figure 9:
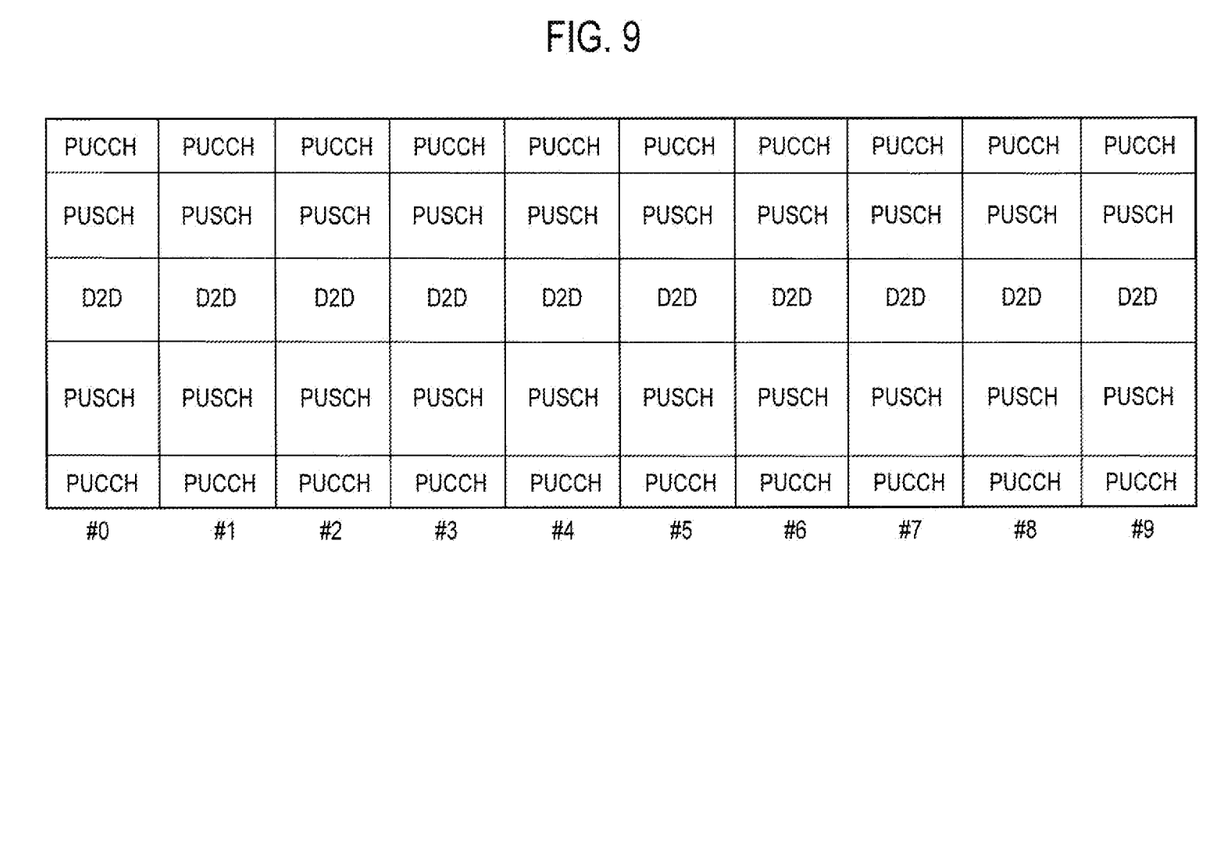
FIG. 9 is a diagram for explaining an example of assignment of a D2D resource.

FIG. 9 is a diagram for explaining an example of assignment of the D2D resource.

As illustrated in FIG. 9, the eNB 200 assigns the D2D resource to the uplink frequency band. In the example in FIG. 9, (one or a plurality of) specific resource blocks in the uplink frequency band are assigned as the D2D resource. For example, when considering the case in which the UE 100-1 and the UE 100-2 perform the D2D communication, data transmission by the UE 100-1 and data reception by the UE 100-2 are performed by using a specific resource block of a subframe #0. Next, data reception by the UE 100-1 and data transmission by the UE 100-2 are performed by using a specific resource block of a subframe #1. Then, such operations are repeated.

(5) Operation

Hereinafter, the operation according to the present embodiment will be described. The UE 100 according to the present embodiment performs both the cellular communication and the D2D communication with the eNB 200. The UE 100 transmits the SRS to the eNB 200. When at least a part of the SRS resource overlaps the D2D resource, the UE 100 stops transmitting the SRS in the SRS resource.

Figure 10:
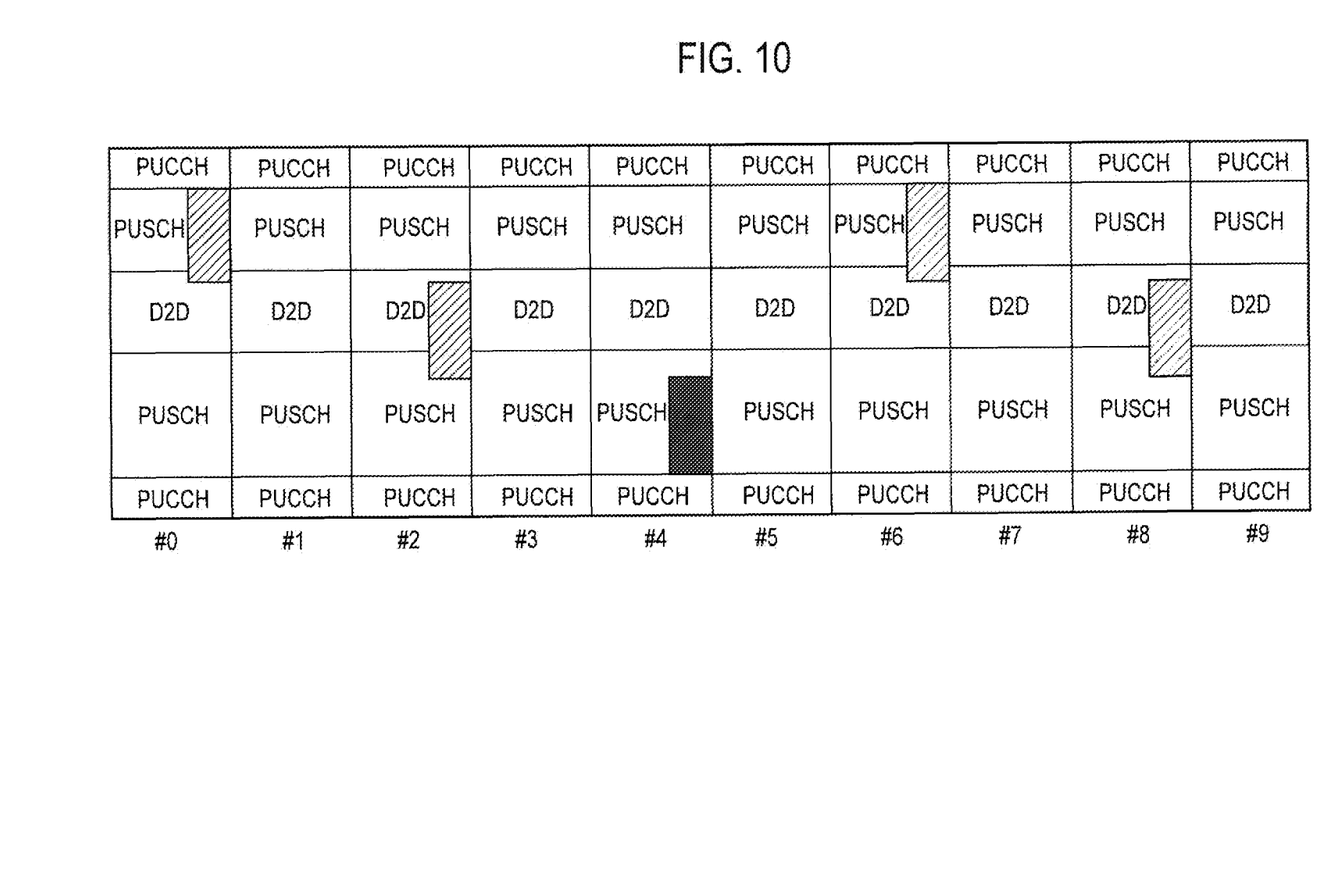
FIG. 10 is a diagram for explaining an operation pattern 1 according to an embodiment.

FIG. 10 is a diagram for explaining an operation pattern 1 according to the present embodiment. In FIG. 10, a specific resource block in the uplink frequency band is assigned as the D2D resource.

As illustrated in FIG. 10, the UE 100 is set to periodically transmit the SRS to the eNB 200. When at least a part of the SRS resource overlaps the D2D resource, the UE 100 stops transmitting the SRS in all SRS resources. In the example in FIG. 10, in subframes #0, #2, #6, and #8, apart of resource blocks included in SRS resources overlaps a part of resource blocks included in D2D resources. Thus, the UE 100 stops transmitting the SRS in the subframes #0, #2, #6, and #8. By stopping transmitting the SRS, all the D2D resources in the subframes #0, #2, #6, and #8 are available in the D2D communication. On the other hand, in a subframe #4, since an SRS resource does not overlap the D2D resource, the UE 100 transmits the SRS in the subframe #4.

However, in the case of stopping transmitting the SRS in all the SRS resources overlapping the D2D resources, it is probable that a transmission opportunity of the SRS is reduced. Thus, it is preferable that the eNB 200 performs the assignment of at least one of the SRS resource and the D2D resource such that a boundary of the SRS resource coincides, in the frequency direction, with a boundary of the D2D resource. In this way, it is possible to avoid partial overlap of the SRS resource and the D2D resource, so that it is possible to reduce the frequency in which the transmission of the SRS is to be stopped.

Figure 11:
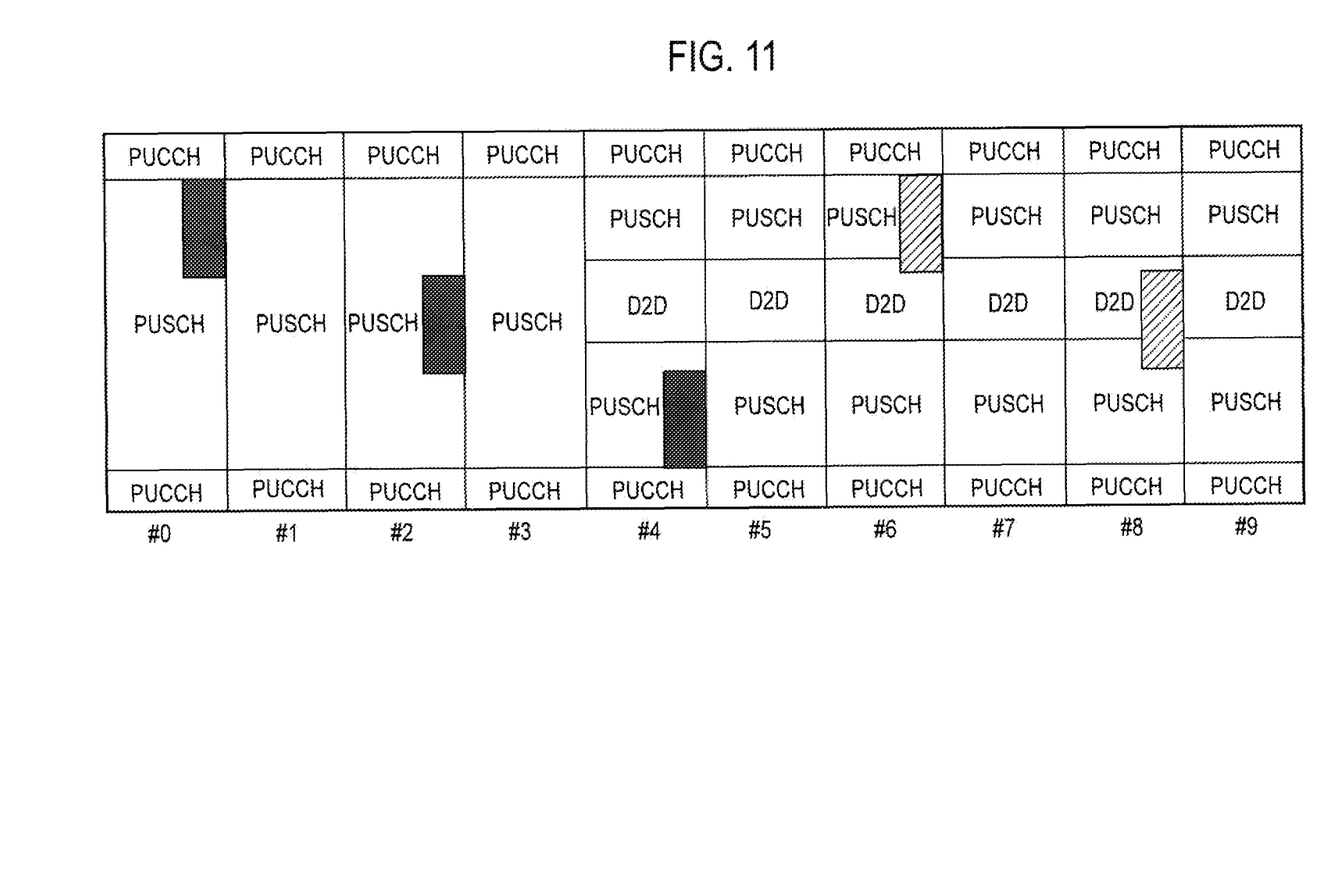
FIG. 11 is a diagram for explaining an operation pattern 2 according to the embodiment.

FIG. 11 is a diagram for explaining an operation pattern 2 according to the present embodiment. In FIG. 11, a specific resource block of a specific subframe in the uplink frequency band is assigned as the D2D resource.

As illustrated in FIG. 11, the UE 100 is set to periodically transmit the SRS to the eNB 200. When at least a part of the SRS resource overlaps the D2D resource, the UE 100 stops transmitting the SRS in all SRS resources. In the example in FIG. 11, in subframes #6 and #8, apart of resource blocks included in SRS resources overlaps a part of resource blocks included in D2D resources. Thus, the UE 100 stops transmitting the SRS in the subframes #6 and #8. On the other hand, in subframes #0, #2, and #4, since an SRS resource does not overlap a D2D resource, the UE 100 transmits the SRS in the subframes #0, #2, and #4.

Figure 12:
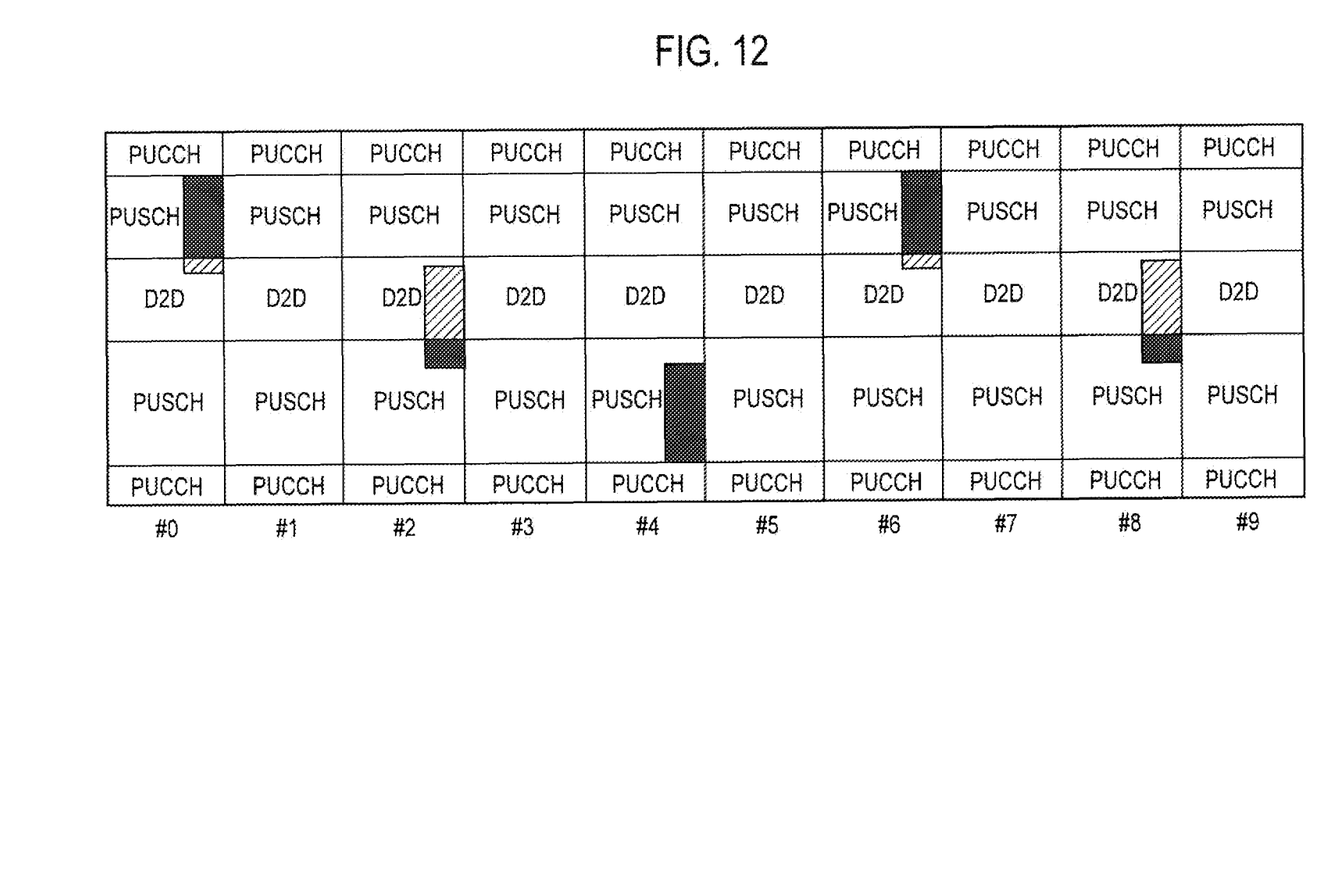
FIG. 12 is a diagram for explaining an operation pattern 3 according to the embodiment.

FIG. 12 is a diagram for explaining an operation pattern 3 according to the present embodiment. Hereinafter, differences from the aforementioned operation pattern 1 will be described.

As illustrated in FIG. 12, when a part of an SRS resource overlaps a D2D resource, the UE 100 stops transmitting the SRS only in the overlapping part of the SRS resource. In the example in FIG. 12, in subframes #0, #2, #6, and #8, a part of resource blocks included in SRS resources overlaps a part of resource blocks included in D2D resources. Thus, the UE 100 stops transmitting the SRS only in partial resource blocks of the SRS resources, which overlap the D2D resources, in the subframes #0, #2, #6, and #8. In this way, it is possible to transmit the SRS in a part of the SRS resources, which does not overlap the D2D resources. Furthermore, by stopping transmitting the SRS, all the D2D resources in the subframes #0, #2, #6, and #8 are available in the D2D communication.

Figure 13:
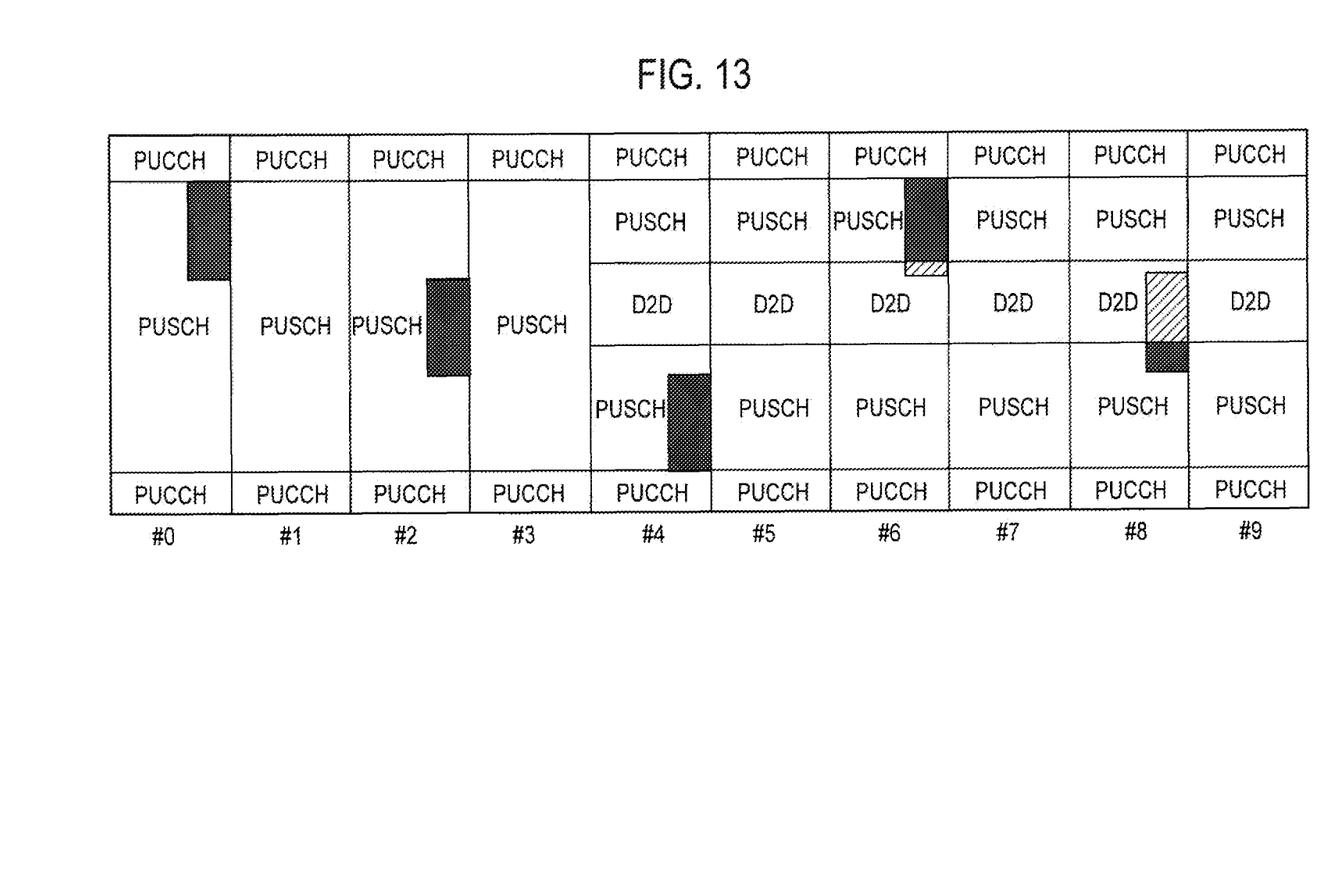
FIG. 13 is a diagram for explaining an operation pattern 4 according to the embodiment.

FIG. 13 is a diagram for explaining an operation pattern 4 according to the present embodiment. Hereinafter, differences from the aforementioned operation pattern 2 will be described.

As illustrated in FIG. 13, when a part of the SRS resource overlaps the D2D resource, the UE 100 stops transmitting the SRS only in the overlapping part of the SRS resource. In the example in FIG. 13, in subframes #6 and #8, a part of resource blocks included in SRS resources overlaps a part of resource blocks included in D2D resources. Thus, the UE 100 stops transmitting the SRS only in a part of resource blocks of the SRS resources, which overlap the D2D resources, in the subframes #6 and #8. In this way, it is possible to transmit the SRS in a part of the SRS resources, which does not overlap the D2D resources. Furthermore, by stopping transmitting the SRS, all the D2D resources in the subframes #6 and #8 are available in the D2D communication.

(6) Conclusion

As described above, when at least apart of the SRS resource overlaps the D2D resource, the UE 100 according to the present embodiment stops transmitting the SRS in the SRS resource. In this way, it is possible to avoid that the D2D resource is not available due to the transmission of the SRS, so that it is possible to appropriately perform the D2D communication. Furthermore, the SRS is a reference signal used when the eNB 200 estimates channel characteristics (specifically, channel characteristics of a frequency band corresponding to the SRS resource) for the SRS resource and controls the cellular communication on the basis of the estimated channel characteristics. Thus, when the SRS resource overlaps the D2D resource for the D2D communication, significance for the estimation of the channel characteristics for the SRS resource is reduced. In other words, even though the transmission of the SRS in the SRS resource overlapping the D2D resource is stopped, it is possible to appropriately perform the cellular communication. Consequently, according to the present embodiment, it is possible to allow cellular communication and D2D communication to appropriately coexist with each other.

(7) Other Embodiments

As described above, the present invention has been described with the embodiments. However, it should not be understood that those descriptions and drawings constituting apart of the present disclosure limit the present invention. From this disclosure, a variety of alternate embodiments, examples, and applicable techniques will become apparent to a person skilled in the art.

The aforementioned embodiment mainly describes SRS that is periodically transmitted. However, the present invention can also be applied to SRS that is aperiodically transmitted. Specifically, when at least a part of an SRS resource that is aperiodically set overlaps the D2D resource, the UE 100 stops transmitting the SRS in the SRS resource.

In addition, the entire content of U.S. Provisional Application No. 61/676,777 (filed on Jul. 27, 2012) is incorporated in the present specification by reference.

INDUSTRIAL APPLICABILITY

As described above, the present invention is able to allow cellular communication and D2D communication to appropriately coexist with each other, and thus is available for a radio communication field such as mobile communication.

The invention claimed is:

1. A mobile communication system, comprising:
a radio terminal that:
performs uplink communication with a base station by transmitting a first signal to the base station, the first signal using radio resources having a time dimension and a frequency dimension, the first signal also containing sounding reference signals, and
performs Device to Device (D2D) communication with another radio terminal by transmitting a second signal to the another radio terminal, the second signal also using radio resources having a time dimension and a frequency dimension, wherein a frequency range of the first signal is different from a frequency range of the second signal, wherein
in response to a situation when sounding reference signals in a given subframe of the first signal simultaneously occur in both the frequency range of the first radio signal and the frequency range of the second radio signal, the radio terminal stops transmitting only those sounding reference signals in the given subframe that occur in the frequency range of the second radio signal and continue transmitting those sounding reference signals in the given subframe that occur in the frequency range of the first radio signal.

2. A radio terminal comprising:
a processor and a memory coupled to the processor, the processor configured to:
perform uplink communication with a base station by transmitting a first signal to the base station, the first signal using radio resources having a time dimension and a frequency dimension, the first signal also containing sounding reference signals, and
perform Device to Device (D2D) communication with another radio terminal by transmitting a second signal to the another radio terminal, the second signal also using radio resources having a time dimension and a frequency dimension, wherein a frequency range of the first signal is different from a frequency range of the second signal, wherein
in response to a situation when sounding reference signals in a given subframe of the first signal simultaneously occur in both the frequency range of the first radio signal and the frequency range of the second radio signal, the processor stops transmitting only those sounding reference signals in the given subframe that occur in the frequency range of the second radio signal and continue transmitting those sounding reference signals in the given subframe that occur in the frequency range of the first radio signal.

3. An apparatus to be provided in a radio terminal, comprising:
a processor and a memory coupled to the processor, the processor configured to:
perform uplink communication with a base station by transmitting a first signal to the base station, the first signal using radio resources having a time dimension and a frequency dimension, the first signal also containing sounding reference signals, and
perform Device to Device (D2D) communication with another radio terminal by transmitting a second signal to the another radio terminal, the second signal also using radio resources having a time dimension and a frequency dimension, wherein a frequency range of the first signal is different from a frequency range of the second signal, wherein
in response to a situation when sounding reference signals in a given subframe of the first signal simultaneously occur in both the frequency range of the first radio signal and the frequency range of the second radio signal, the processor stops transmitting only those sounding reference signals in the given subframe that occur in the frequency range of the second radio signal and continue transmitting those sounding reference signals in the given subframe that occur in the frequency range of the first radio signal.

* * * * *